United States Patent
Dain et al.

(10) Patent No.: US 8,424,317 B2
(45) Date of Patent: Apr. 23, 2013

(54) THERMAL INSULATION TECHNIQUE FOR ULTRA LOW TEMPERATURE CRYOGENIC PROCESSOR

(75) Inventors: John Dain, Hollister, CA (US); Boyd Bowdish, Los Gatos, CA (US); Nick Henneman, Tres Pinos, CA (US)

(73) Assignee: Reflect Scientific Inc., Orem, UT (US)

( * ) Notice: Subject to any disclaimer, the term of this patent is extended or adjusted under 35 U.S.C. 154(b) by 127 days.

(21) Appl. No.: 12/894,206

(22) Filed: Sep. 30, 2010

(65) Prior Publication Data

US 2012/0055936 A1 Mar. 8, 2012

Related U.S. Application Data

(63) Continuation of application No. 11/934,696, filed on Nov. 2, 2007, now Pat. No. 7,823,394.

(51) Int. Cl.
*F17C 3/08* (2006.01)

(52) U.S. Cl.
USPC ................................. 62/45.1; 62/100

(58) Field of Classification Search .................. 62/45.1, 62/47.1, 48.3, 100, 268, 259.1, 457.2, 457.9; 220/560.15, 259.27, 592.27
See application file for complete search history.

(56) References Cited

U.S. PATENT DOCUMENTS

| | | | | |
|---|---|---|---|---|
| 4,713,941 A * | 12/1987 | Toyoda et al. | ............... | 62/48.3 |
| 4,816,364 A * | 3/1989 | Oishi et al. | ............... | 430/111.32 |
| 5,077,979 A * | 1/1992 | Skertic et al. | ............... | 62/51.2 |
| 5,419,152 A * | 5/1995 | Silber | ............... | 62/372 |
| 6,038,867 A * | 3/2000 | Einziger et al. | ............... | 62/45.1 |
| 6,405,556 B1 * | 6/2002 | Bucholz | ............... | 62/457.2 |
| 2005/0016198 A1* | 1/2005 | Wowk et al. | ............... | 62/371 |

* cited by examiner

*Primary Examiner* — Mohammad Ali
(74) *Attorney, Agent, or Firm* — Tran & Associates

(57) ABSTRACT

Systems and methods are disclosed to provide an ultra low temperature (ULT) cryogenic processor apparatus. The apparatus includes an external housing with flat sides; an inner housing coupled to the external housing to define a vacuum region there between; material disposed in the vacuum region to provide redundant insulation and structural support; and a cryogenic heat exchanger contained in the inner housing.

18 Claims, 5 Drawing Sheets

| |
|---|
| Position a plurality of shells such as foams on all sides of a vessel without a direct energy pathway from outer walls of the vessel to the inner walls of the vessel (1) |
| |
| Place the foam shells under vacuum (2) |
| |
| Cryogenically cool the foam shells (3) |
| |
| While under vacuum, allow the shell temperature to rise from a cryogenic temperature to an ambient temperature (4) |

THERMAL INSULATION TECHNIQUE FOR ULTRA LOW TEMPERATURE CRYOGENIC PROCESSOR

This application is a continuation of application Ser. No. 11/934,696 filed on Nov. 2, 2007, the content of which is incorporated by reference.

BACKGROUND OF THE INVENTION

This invention relates to a thermal insulation technique for ultra low temperature cryogenic processors.

Vacuum insulating panels are used conventionally for thermal insulation. Known vacuum insulating panels consist of a pre-compressed porous filling, a porous pressboard or an open-cell rigid foam as substrate, which is enveloped by a gas-tight film, wherein the film is heat-seated or bonded after the evacuation.

The following, for example, are used as filling materials for vacuum insulating panels: precipitated and dried silicas, silica gels, fly ash, open-cell foams on an organic base such as open-cell rigid polyurethane foams or bonded rigid polyurethane foam paste. Vacuum insulating panels of this type are used in the manufacture of cold rooms, e.g., refrigerators or refrigerated containers, with the latter being inserted between the outer and inner casing and the gap left between the outer and inner casing being filled with foam.

The fitting of the vacuum insulation panels into refrigerator casings nevertheless presents problems. According to the current state of the art, they are bonded onto a plate—for example, a metal cassette—by means of a double-sided adhesive film. This combination plate can then be processed further into a sandwich panel, for example, a refrigerator door, wherein the cavity left is conventionally filled with foam.

As a result, on the one hand, a complicated, multi-step process is required, and on the other hand, the insulation volume is affected by the foam, which is less efficient in insulation terms when compared with a vacuum insulation panel. Arrangements of this type are also, to only a limited extent, without thermal bridges.

U.S. Pat. No. 6,164,030 discloses an apparatus which consists of a rigid plate and a vacuum insulation panel, in which the vacuum insulation panel is fixed to the rigid plate by a polyurethane foam applied as a liquid reaction mixture, wherein the vacuum insulation panel contains open-cell rigid plastics foam and/or open-cell rigid plastics foam recyclate.

SUMMARY

In a first aspect, systems and methods are disclosed to provide an ultra low temperature (ULT) cryogenic processor apparatus. The apparatus includes an external housing with flat sides; an inner housing coupled to the external housing to define a vacuum region there between; material disposed in the vacuum region to provide redundant insulation and structural support; and a cryogenic heat exchanger contained in the inner housing.

Implementations of the above aspect may include one or more of the following. The material can be an insulation material with one of: a silica micro balloon, polyisocyanurate. The vacuum region can be processed by removing residual water vapor and other partial pressure of contaminants. The vacuum region is evacuated to a partial pressure of approximately 0.2 milliTorr. The cryogenic heat exchanger can include one or more tubings and may include redundant tubings. The cryogenic heat exchanger can be U-shaped tubings covering at least three walls of the payload bay. The cryogenic heat exchanger can include tubings covering at least four sides of the payload bay. Alternatively, the cryogenic heat exchanger can be one or more coils positioned on the top and/or the bottom of the vessel. A port can connect to the one or more tubings to provide input and output connections thereto. A door can allow access to the payload bay, wherein the door comprises three or more materials having different thermal characteristics.

In another aspect, a method to provide ultra low temperature processing and/or storage includes providing insulation and structural support using a material disposed in a vacuum region between an external housing and an inner housing; and cryogenically processing one or more compartments contained in the payload bay.

Implementations of the above aspect may include one or more of the following. The material can be an insulation material with silica micro balloon technology. The process can remove water vapor, partial pressure contaminates and atmospheric gases from the vacuum region. The process includes evacuating the vacuum region to approximately 0.2 millitorr. The cryogenic heat exchanger can have one or more heat exchange tubings, and can include redundant tubings. The redundant tubings can be a complete set of heat exchange tubings operating in parallel with the primary heat exchange tubings. The redundant tubings can have one or more tubings branched from the primary heat exchange tubings. The cryogenic heat exchanger can also include U-shaped tubings covering at least three walls of the inner housing. The tubings can cover at least four sides of the inner housing. A door can be formed with a plurality of materials each having different thermal characteristics. A changeable rack assembly is supported in the chamber. The system can transmit energy from the payload bay into the heat exchanger through the changeable rack assembly. A negative pressure in the payload bay can be maintained through the use of pneumatic seals on the main door assembly. The cryogenics vacuum pumping via the heat exchanger can provide energy removal from the payload bay and into the heat exchanger. The surfaces of at least one of the external and inner housing can be flat surfaces.

In another aspect, a method to insulate a vessel includes placing a plurality of shells on all sides of the vessel without providing a direct energy pathway from outer walls of the vessel to the inner walls of the vessel; placing the shells under a vacuum; cryogenically cooling the shells to a cryogenic temperature; and while under vacuum, allowing the shell temperature to rise from the cryogenic temperature to ambient temperature.

Implementations of the above aspect may include one or more of the following. The process can include milling spaced-apart pathways in the shells. Such millings facilitate an evacuation of the trapped spaces of the shells and allowing for a desorbtion of a surface area of the shells. A vacuum pump can maintain a partial pressure of the vacuum in the vessel to below approximately 10 millitorr. The vacuum pump is a non-oil based pump. Initially, the process evacuates the shells to a total pressure of approximately 500 millitorr. The process then cryogenically cools the shells to a temperature of less than approximately −175° C. Next, gettered gases can be removed by a pseudo thermo/kinetic energy transfer during the rise to ambient temperature. The shells can be a foam material. The shell layout prevents heat gain energy from migrating from the outer walls to the inner walls by presenting at least two 90 degree flow pathway changes.

In another aspect, an insulated vessel includes outer walls; inner walls spaced apart from the outer walls to define a vacuumed insulation volume; and a plurality of shells placed in the insulation volume without providing a direct energy pathway from outer walls of the vessel to the inner walls of the vessel, wherein the shells are cryogenically cooled to a cryogenic temperature and while under vacuum, the shell temperature is raised from the cryogenic temperature to ambient temperature.

Implementations of the above aspect may include one or more of the following. Spaced-apart pathways can be milled in the shells. The pathways facilitate an evacuation of the trapped spaces of the shells and allowing for a desorbtion of a surface area of the shells. A vacuum pump can maintain a partial pressure of the vacuum in the insulation volume to below approximately 10 millitorr. The vacuum can be provided using a non-oil based pump. The pump can initially evacuate the insulation volume to a total pressure of approximately 500 millitorr. A cryogenic heat exchanger can cryogenically cool the shells to a temperature below approximately −175° C. Gettered gases can be removed by a pseudo thermo/kinetic energy transfer during the rise to ambient temperature. Each shell can be a foam material. The shells prevent heat gain energy from migrating from the outer walls to the inner walls by presenting at least two 90 degree flow pathway changes.

Advantages of the preferred embodiment may include one or more of the following. The system has a thermal insulation technique that combines a highly non-compressible foam and traditional vacuum processing techniques to produce a novel insulation technique. This technique can be used to reduce the heat gain properties of a low temperature vessels and allow for the manufacture of square, flat walled vacuum chambers that demonstrate no structural deformation or metal fatigue during the evacuation process. The theoretical R-value of this technique is greater then 100 as measured by the International System of Units—RSI.

BRIEF DESCRIPTION OF THE DRAWINGS

FIG. 1 shows an exemplary process to insulate a vessel.

DESCRIPTION

FIG. 1 shows an exemplary process to insulate a vessel such as a biological storage chamber, among others. The process forms a plurality of foam shells on all sides of a vessel without a direct energy pathway from outer walls of the vessel to the inner walls of the vessel (1). Next, the process places the foam shells under vacuum (2). The process then cryogenically cools the foam shells (3); and while under vacuum, allowing the foam shell temperature to rise from a cryogenic temperature to an ambient temperature (4).

Figure 2:
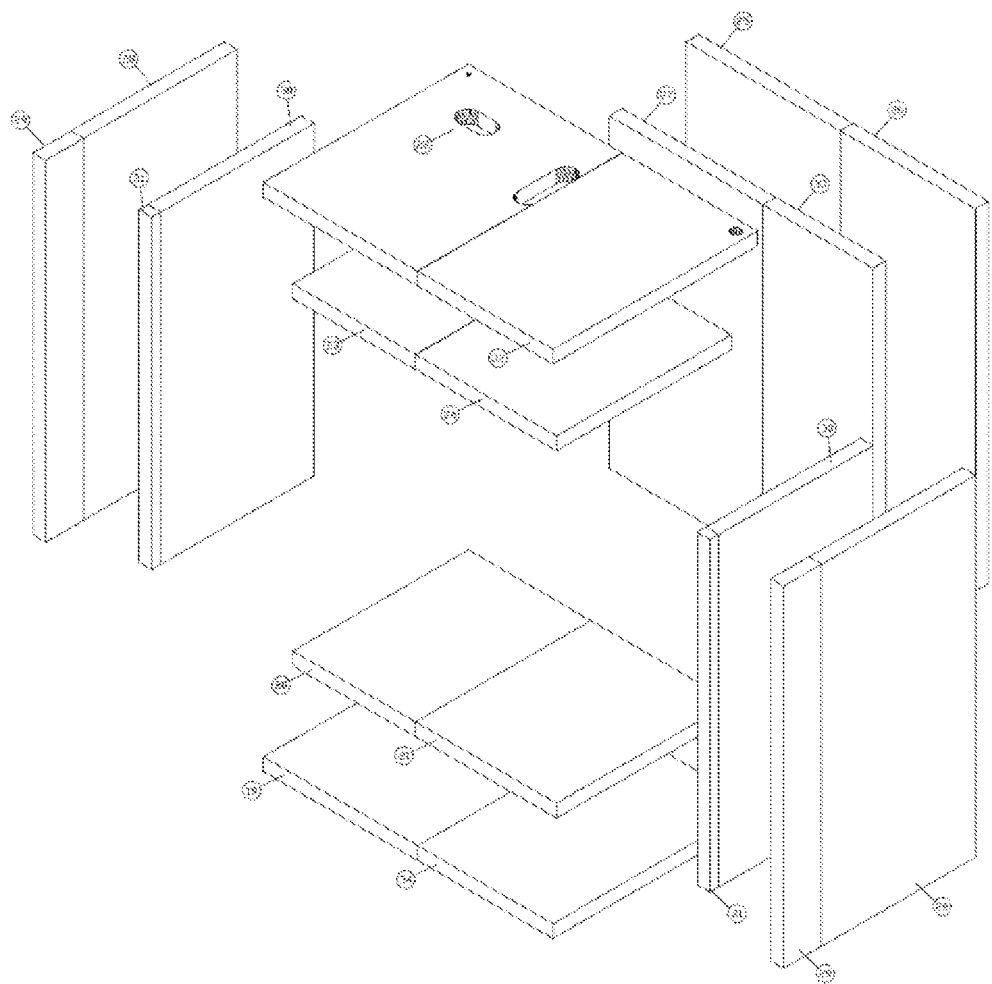
FIG. 2 shows an exemplary shell arrangement.

FIG. 2 shows an exemplary shell arrangement. The shell can be made of foam, among other materials. In FIG. 2, two outside back shell portions 25 and 26 are positioned adjacent each other. Portions 25 in turn faces inner back shell portions 27 and 33. These portions in turn are surrounded on left and right sides by a pair of side shell assembly having an outside side shell portions 28 and 29 that face inside side shell portions 30 and 31. The back shell portions and the side shell portions are in turn connected to top and bottom shell assemblies. The bottom shell assembly includes outer bottom shelf portions 19 and 34 facing inner bottom shelf portions 20-21.

The top shell assembly includes outer top shelf portions 22 and 32 that face inner top shelf portions 23-24. The top shell assembly include openings 22 that allow cryogenic coolants to enter and exit a payload chamber as shown in more details below.

In one embodiment, each foam piece is four inches thick and is made from a polyisocyanurate material. The vacuum vessel is made of austenitic stainless steel, type 302, 304, 316, 321 or 347. The foam design places foam sections on all sides of a vessel and will be designed so that there are no direct energy pathways from the outer walls to the inner wall. The arrangement challenges any heat gain energy from migrating from the outer wall to the cryogenically tempered inner surface by presenting at least two 90 degree flow pathway changes. All energy migrating from outer to inner is gettered by the kinetic properties of the foam, while in molecular flow regime. All foam sections will have vacuum pathways milled into them which are 0.065" in cross section, spaced in an arrangement that facilitates the evacuation of the trapped spaces of the foam sections and allowing for the desorption of the surface area of the foam to a minimum of 100 monolayers in one embodiment. After the milling operation, the foam itself has enough surface area and flow obstructions as to prevent serious back flow of contaminates into the vacuum space. Vacuum channels are placed on the foam to allow for two processes to happen. First, the channels facilitate the general evacuation of the chambers and second, the channels facilitate the desorption of water vapor from the foam surface. The vacuum processing reduces the partial pressure of the vacuum vessel to a point lower than 10 millitorr as measured by a thermocouple or similar total pressure gauge. The use of non-oil based vacuum pumps prevents the back streaming of residual water and oil vapor with its contaminating gas load.

In addition to using oil free vacuum pumps, a cold processing technique is applied to the shells. The technique includes of three separate steps.

Firstly, the assembly is evacuated to a total pressure of approximately 500 millitorr. The specific ultimate pressure is not important.

Secondly, the assembly is then cryogenically cooled to a temperature of no more then −175° C. as measured on the inner wall of the vacuum chamber. This getters contaminant gases onto the inner wall of the vacuum chamber via thermodynamic processes, thus conditioning the foam.

Lastly, while the vacuum pump system is connected and applied to the vacuum chamber, the temperature is allowed rise to ambient. The vacuum pump removes all of the gettered gases by way of a pseudo thermo/kinetic energy transfer.

The following examples are intended to explain the invention in greater detail, but without limiting it in its scope. In one exemplary embodiment, the foam is a Polyisocyanurate Insulation that has the following specifications:

| Compressive Strength3 D 1621 lb/in2 | | kPa |
|---|---|---|
| Parallel to Rise (Thickness) | 140 | 970 |
| Perpendicular to Rise (Width) | 130 | 900 |
| Perpendicular to Rise (Length) | 130 | 900 |
| Compressive Modulus D 1621 lb/in2 | | kPa |
| Parallel to Rise (Thickness) | 3100 | 21400 |
| Perpendicular to Rise (Width) | 2800 | 19300 |
| Perpendicular to Rise (Length) | 2800 | 19300 |
| Shear Strength C 273 lb/in2 | | kPa |
| Parallel to Rise | 80 | 550 |
| Shear Modulus C 273 lb/in2 | | kPa |

-continued

| | | |
|---|---|---|
| Parallel to Rise | 800 | 5500 |
| Tensile Strength D 1623 lb/in2 kPa | | |
| Parallel to Rise (Thickness) | 80 | 550 |
| Tensile Modulus D 1623 lb/in2 kPa | | |
| Parallel to Rise (Thickness) | 2800 | 19300 |
| Flexural Strength C 203 lb/in2 kPa | | |
| Parallel to Rise | 160 | 1100 |
| Flexural Modulus C 203 lb/in2 kPa | | |
| Parallel to Rise | 5800 | 40000 |
| k-Factor (75° F. (24° C.) mean temp.) C 518 BTU · in/hr · ft2 · ° F. W/m° C. | | |
| Initial | 0.180 | 0.026 |
| Aged 180 days @ 75° F. (24° C.) | 0.200 | 0.029 |
| R-Value/in (75° F. (24° C.) mean temp.) C 518 Hr · ft2 · ° F./BTU m2 · ° C./W | | |
| Initial | 5.5 | 0.97 |
| Aged 180 days @ 75° F. (24° C.) | 5.0 | 0.88 |
| Closed Cell Content D 2856 | % 97 | % 97 |
| Water Absorption C 272 | % by Volume 0.7 | % by Volume 0.7 |
| Water Vapor Permeability E 96 Perm-Inch | 1.1 (ng/Pa · s · m) | 1.6 |
| Dimensional Stability4 D 2126 @ −40° F. (−40° C.), 7 days | | |
| Length | % Change −0.3 | % Change −0.3 |
| Volume | % Change −0.1 | % Change −0.1 |
| @ 158° F. (70° C.)/97% Relative Humidity, 7 days | | |
| Length | % Change 0.4 | % Change 0.4 |
| Volume | % Change 0.7 | % Change 0.7 |
| @ −10° F. (−23° C.), 7 days | | |
| Length | % Change −0.2 | % Change −0.2 |
| Volume | % Change −0.7 | % Change −0.7 |
| @ 300° F. (149° C.), 7 days | | |
| Length | % Change −0.4 | % Change −0.4 |
| Volume | % Change −1 | % Change −1 |

Service Temperature5 ° F. −297 to +300 ° C. −183 to +149

Figure 3:
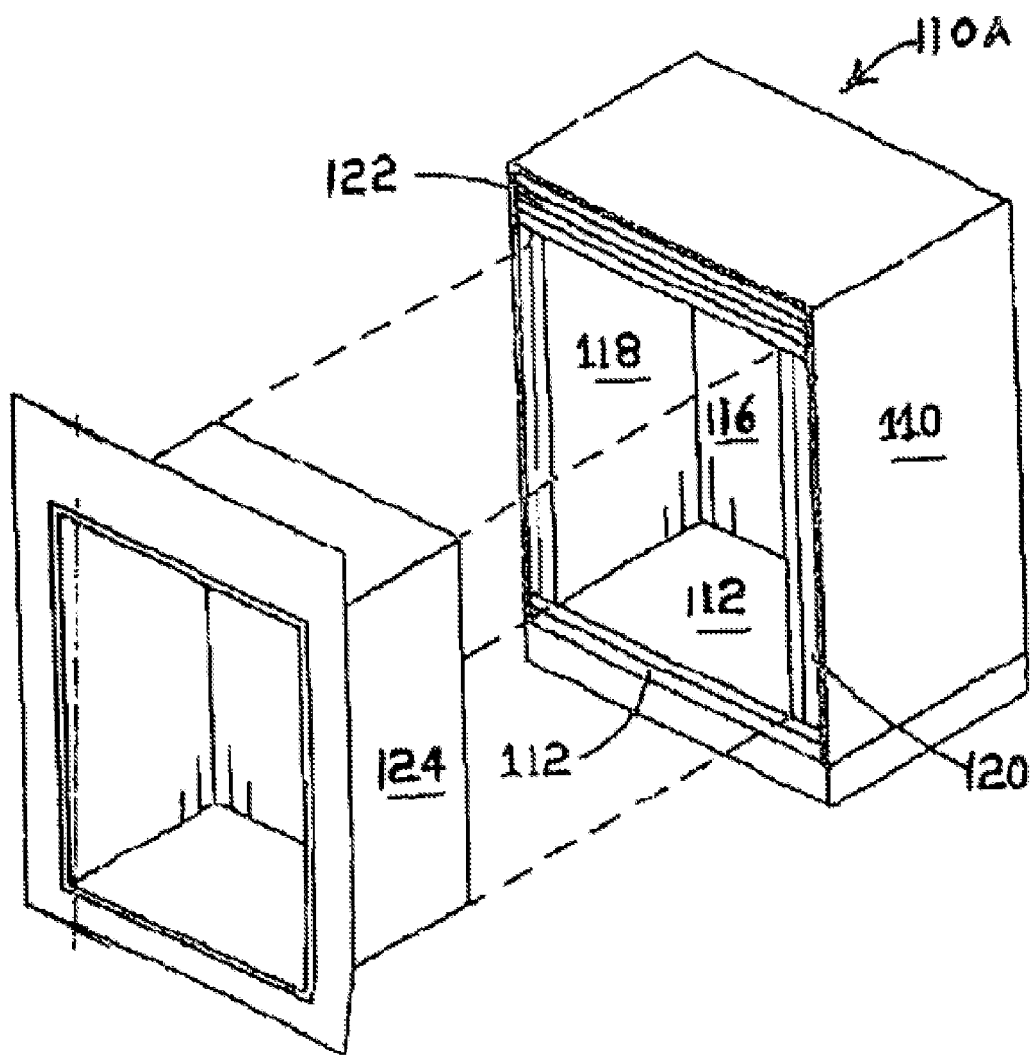
FIG. 3 shows an assembly of the vessel with outer walls, shells, and the payload chamber.

FIG. 3 shows an assembly of a vessel 110 with outer walls, shells, and inner walls formed by the exterior of the payload chamber. FIG. 3 shows the five-sided outer "tub" 110A assembled with a lining of insulation, into which is inserted metal inner "tub" 124, typically of 16 gauge stainless steel, having a front flange which extends around the perimeter. This is seamlessly laser-welded to the alter tub 110 all around in a no leak manner to form an insulation tub 110B with the five hollow walls totally enclosed and filled with the shell portions 112, 122, 116, 118, 120 and 122. More details on the vessel 110 are disclosed in co-pending application Ser. No. 11/890,451, filed on Aug. 7, 2007, the content of which is incorporated by reference.

Figure 4:
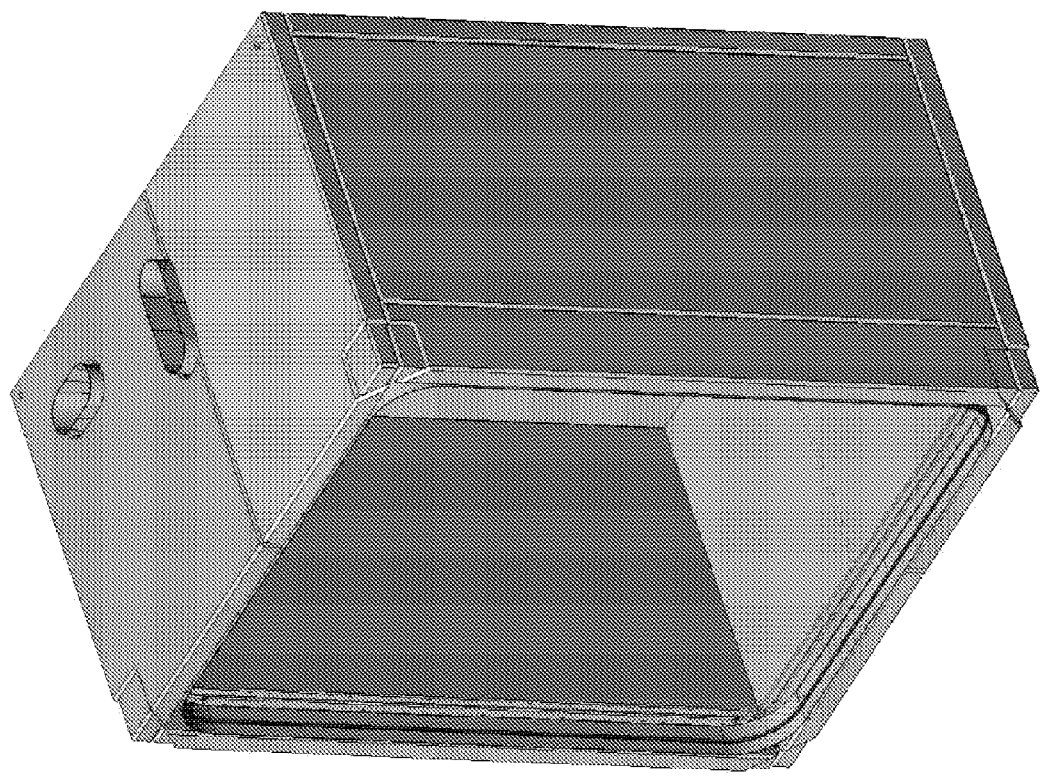
FIG. 4 shows an exemplary payload chamber enclosed by the shell.

FIG. 4 shows an exemplary assembled payload chamber enclosed by an insulation volume where the shells are placed. In one embodiment, this shell portions can be first purged of moisture at 120 degrees C. then evacuated at 100 degrees C. to a vacuum of approximately 0.0002 torr (i.e. 02 millitorrs, 1 torr=1/760 atmosphere) and then sealed off as a vacuum-insulation-walled enclosure.

The rigidity and high compressive strength of the shell material serve to counteract and minimize inward bending distortion of the two opposed metal sheets due to stress from the internal vacuum and external atmospheric pressure as the shell material provides sufficient compressive strength.

Figure 5:
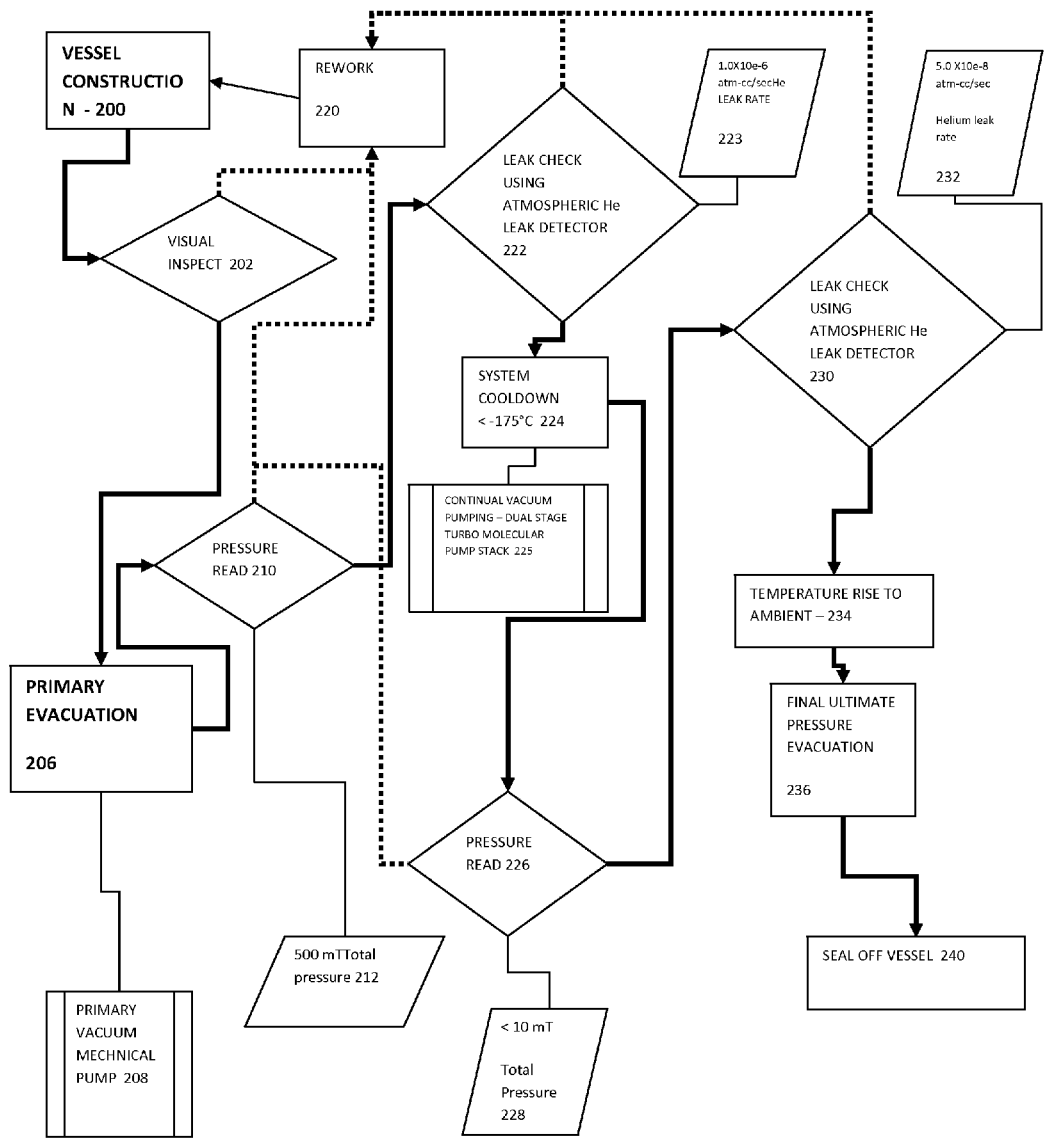
FIG. 5 shows an exemplary cold vacuum processing operation.

FIG. 5 shows an exemplary cold vacuum processing operation. First, the vessel is constructed (200) and a visual inspection is done (202) in accordance with a manufacturing protocol (204). If the visual inspection passes, a primary evacuation operation is done (206). The primary evacuation can be done using a mechanical pump (208). After the primary evacuation, a pressure reading is done (210). The reading tests that a total pressure of about 500 millitorr is in the chamber within 60 minutes (212). Next, the system performs a leak check using an atmospheric helium leak detector (222). The system confirms that the leak rate is less than 10e-6 atm-cc/sec in one embodiment (223). Next, the system is cooled to less than −175 degree C. (224) while a continual vacuum pumping dual stage turbo molecular pump is operated (225). Next, a pressure reading is taken (226). Preferably, the pressure is less than 10 millitorr (228). The system also checks for leak using the atmospheric helium leak detector (230). The helium leak rate is ascertained (232). The temperature of the vessel is then allowed to rise to ambient temperature while under vacuum (234). A final ultimate pressure evacuation is done (236) and the vessel is sealed (240).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A vacuum insulated panel, comprising:
   a) an external surface;
   b) an inner surface coupled to the external surface to define a vacuum region therebetween;
   c) material disposed in the vacuum region to provide insulation and structural support, wherein the vacuum region is processed by removing air, residual water vapor or other partial pressure of contaminants.

2. The vacuum insulated panel of claim 1, wherein the material comprises silica micro balloon.

3. The vacuum insulated panel of claim 1, wherein the vacuum region is evacuated to a partial pressure of approximately 0.2 milliTorr.

4. The vacuum insulated panel of claim 1, wherein the material provides insulation instead of air insulation.

5. The vacuum insulated panel of claim 1, wherein the material comprises a solid or a liquid.

6. The apparatus of claim 1, wherein the panel is rigid.

7. The vacuum insulated panel of claim 1, wherein the material comprises a core material for the panel.

8. The vacuum insulated panel of claim 1, wherein the material comprises micro spheres.

9. The vacuum insulated panel of claim 1, wherein the material provides an R-rated insulation value.

10. A method to insulate a panel, comprising:
    providing a core material disposed in the panel;
    providing a vacuum region in the panel by removing air from the panel; and
    removing water vapor, partial pressure contaminates and atmospheric gases from the vacuum region.

11. The method of claim 10, wherein the material comprises an insulation material with silica micro balloon.

12. The method of claim 10, comprising evacuating the vacuum region to approximately 0.2 millitorr.

13. The method of claim 10, comprising cryogenically processing one or more compartments contained in a payload bay.

14. The method of claim 10, wherein the core material provides insulation and structural support for the panel.

15. The method of claim 10, wherein the core comprises spheres.

16. The method of claim 10, comprising providing compressive strength using the core material.

17. The method of claim 10, wherein the material provides redundancy against puncture.

18. The method of claim 10, wherein the material provides an R-rated insulation value of about 5.0 to 5.5.

* * * * *